United States Patent [19]

Gallagher

[11] Patent Number: 4,981,014
[45] Date of Patent: Jan. 1, 1991

[54] ATMOSPHERIC PRESSURE POWER PLANT

[76] Inventor: Paul H. Gallagher, 2530 Crawford Ave., Evanston, Ill. 60201-4970

[21] Appl. No.: 189,720

[22] Filed: May 2, 1988

Related U.S. Application Data

[63] Continuation-in-part of Ser. No. 938,258, Dec. 5, 1986, abandoned, which is a continuation-in-part of Ser. No. 22,697, Mar. 22, 1979, abandoned.

[51] Int. Cl.$^5$ ............................................. F03G 3/00
[52] U.S. Cl. ......................................... 60/412; 185/6; 185/32; 60/721; 60/507; 60/512; 60/513
[58] Field of Search ............... 60/370, 397, 650, 682, 60/698, 721, 407, 411, 412, 507, 508, 512; 185/6, 7, 32, 33

[56] References Cited

U.S. PATENT DOCUMENTS

| | | | |
|---|---|---|---|
| 45,530 | 12/1864 | Smith | 60/698 |
| 1,030,212 | 6/1912 | Stevens | 60/370 |
| 1,342,984 | 6/1920 | Campbell | 60/370 |
| 1,776,963 | 9/1930 | Archer | 60/370 |
| 2,748,561 | 6/1956 | Goodridge | 60/370 |
| 4,541,242 | 9/1985 | Thompson, Jr. | 60/507 X |

*Primary Examiner*—Allen M. Ostrager
*Attorney, Agent, or Firm*—Paul H. Gallagher

[57] ABSTRACT

A shell having a closed upper end and an open lower end, and a weight in the form of a piston sealingly slidable in the shell. In one form partial vacuum is produced in the shell above the weight and atmospheric pressure consequently raises the weight. In another form, pressurized air lifts the weight, against the action of weight. The weight has driving connection with a load, such as a generator, and upon being permitted to drop, acting by its potential energy, drives the load. The partial vacuum is produced in one form, by heating and cooling units; and in another form, by natural heating and cooling. A plurality of power plants are utilized to drive a single load, so that one weight can be raised, and the power plant re-activated, while others continue to drive the load, thereby maintaining continuity of drive. A modified form includes a common reservoir and a plurality of individual power plant units, with the vacuum, or the pressurized air, respectively, in the common reservoir affecting all of the units.

46 Claims, 3 Drawing Sheets

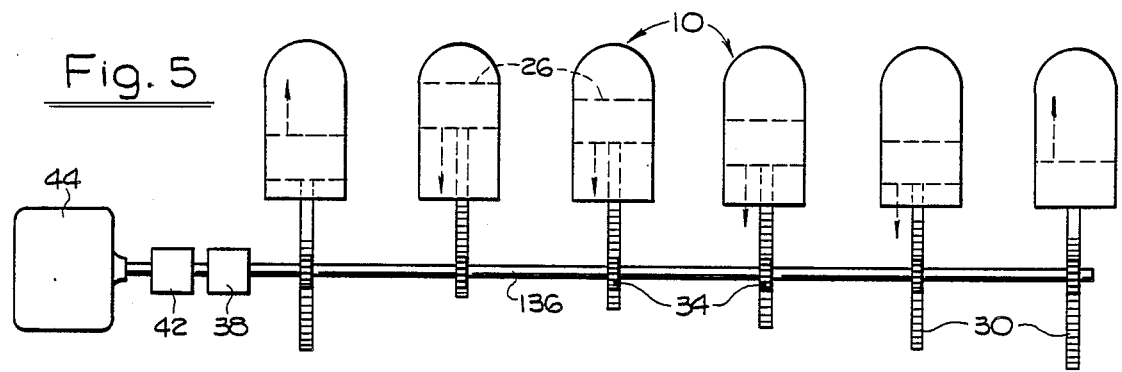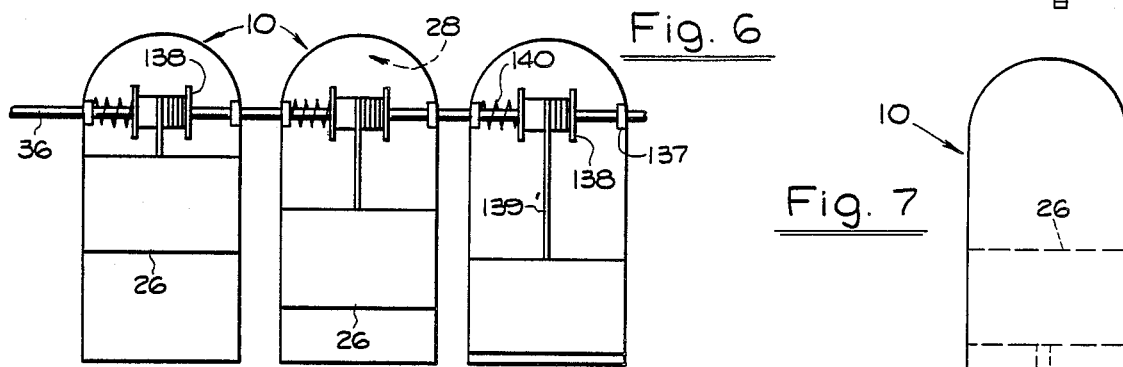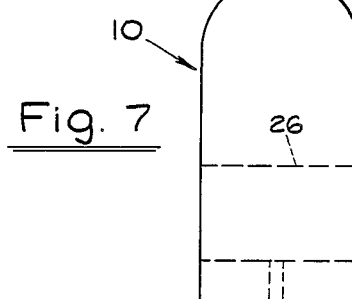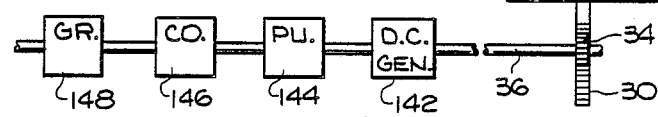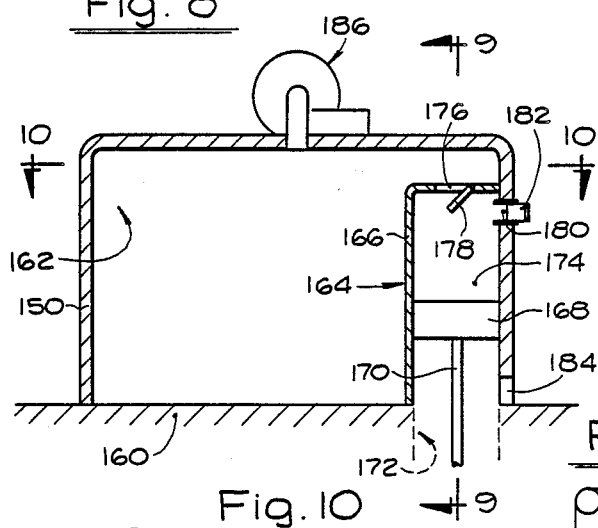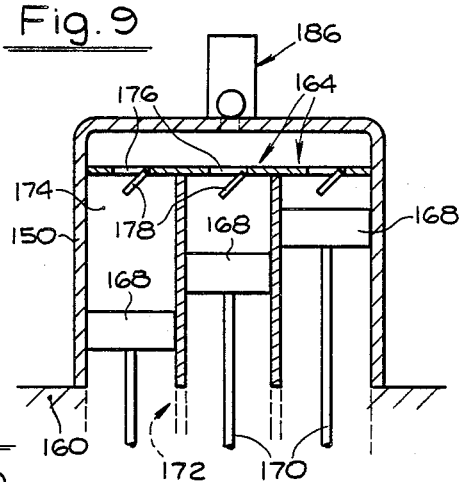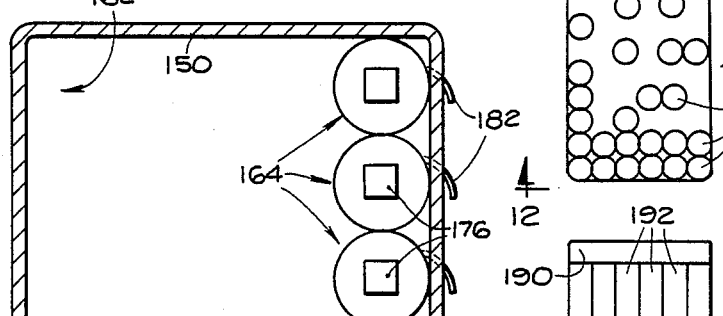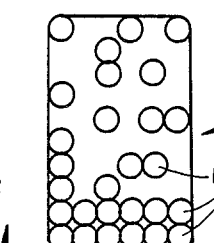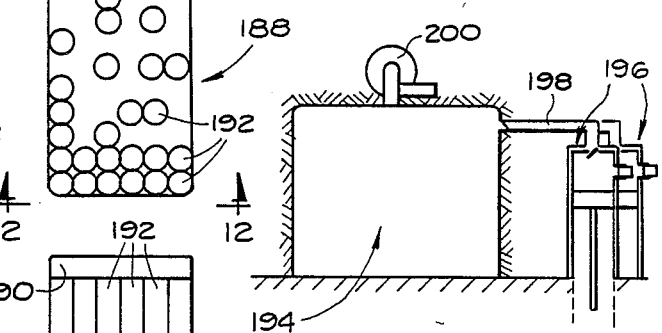

4,981,014

ATMOSPHERIC PRESSURE POWER PLANT

This application is a continuation-in-part of Ser. No. 06/938,258, filed Dec. 5, 1986, now abandoned, which application was a continuation-in-part of Ser. No. 06/022,697, filed Mar. 22, 1979, now abandoned.

FIELD OF THE INVENTION

The invention resides in the broad field of the use of renewable fuel for producing power.

The invention involves the use of atmospheric pressure as the renewable fuel.

The use of atmospheric pressure has not been used heretofore, so far as is known, for producing power and hence it has not been developed into a field known as such.

PRIOR ART

There is no known prior art bearing on this invention.

OBJECTS OF THE INVENTION

A broad object of the invention is to provide a power plant, and method of use thereof, incorporating the broad concept of utilizing atmospheric pressure for producing power.

The broad concept of utilizing atmospheric pressure incorporates the generic concept of utilizing a body of air of a pressure different from atmospheric pressure. That difference in pressure is utilized for lifting a weight, and then the weight is controllably dropped for driving a load. The generic concept includes both sub-generic steps (a) utilizing a body of air of pressure less than atmospheric pressure (vacuum) and utilizing the atmosphere for lifting the weigh-. and (b) utilizing a body of air of pressure greater than atmospheric pressure, and utilizing that pressurized air for lifting the weight.

Additional objects include the provision of means for selectively producing a body of air of pressure greater than atmospheric pressure, or a vacuum, for producing the results stated.

A more specific obJect is to lift a weight in the manner stated, and thereby providing potential energy in the weight.

Another broad obJect is to provide such power plant and method incorporating the following features and advantages:

1. The constancy of atmospheric pressure enables the production of the potential energy under any of a wide variety of conditions.

2. A raised weight is capable of driving a load such as an AC generator with a constant and steady drive.

3. The difference in pressure in bodies of air is produced by natural agencies, or by artificial agencies, selectively.

4. Because of the nature of the invention, a power plant having a power plant unit is provided, with a reservoir of great capacity in which a body of pressurized air or a vacuum is formed, and because of such great capacity, the power plant unit can be activated by a relatively small amount of energy.

5. Also, because of the nature of the invention as just referred to, a plurality of power plant units can be effectively operated by a single such reservoir having the same great capacity relative to a single power plant unit.

6. A plurality of power plants, or power plant units, may be used for driving a single load, which may be staggered relative to each other in their positions in their range of operation, whereby after any weight drops its full range, and before it is raised, others of the weights remain effective for driving the load, thereby maintaining continuity of drive of the load.

DESCRIPTION OF A PREFERRED EMBODIMENT

In the drawings:

FIG. 5 is a view showing a plurality of power plants connected in driving relation to a single load.

FIG. 6 is a view of a plurality of power plants and a modified form of driving means.

FIG. 7 is a view of a power plant and an indication of a variety of different loads that may be driven thereby.

FIG. 8 is vertical sectional view of a modified, multiple unit power plant.

FIG. 9 is a view taken at line 9—9 of FIG. 8.

FIG. 10 is a view, in diagrammatic form, oriented according to line 10—10 of FIG. 8.

FIG. 11 is a diagrammatic view similar to FIG. 10, of another modified form having a greater number of units.

FIG. 12 is a diagrammatic view oriented according to line 12—12 of FIG. 11.

FIG. 13 is a view oriented according to FIG. 8 of an arrangement utilizing a cavern in the ground as a reservoir.

As used herein "weight" refers to the physical or tangible article which upon dropping performs a work operation, and "mass" refers to the quantity of that article; "height" refers to the vertical dimension of the weight, and "altitude" refers to the elevation of the weight above its lowermost position.

Figure 1:
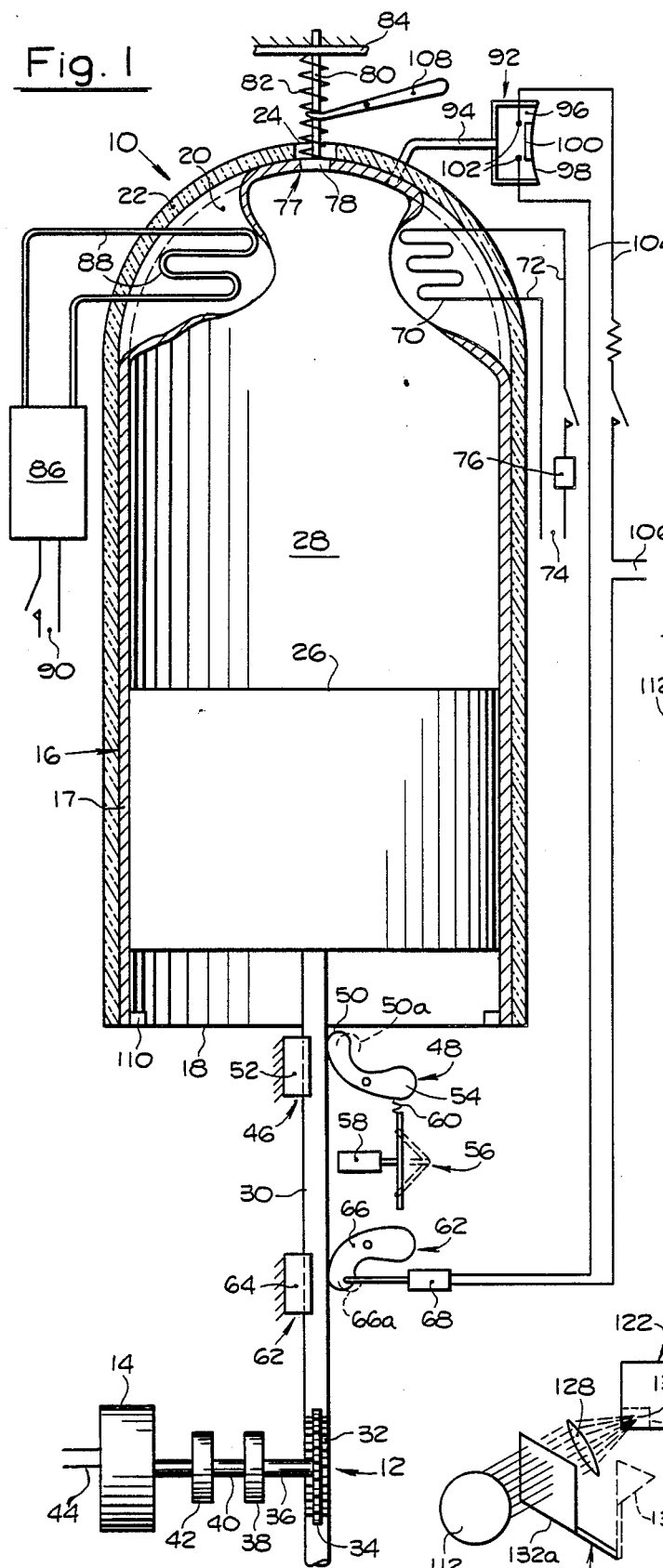
FIG. 1 is a view principally in section, of the power plant and related elements, including the load to be driven.

Referring in detail to the drawings, attention is directed first to FIG. 1 showing the power plant of the invention and driving means interconnecting the power plant and the load. The power plant is shown at 10, with which is associated a drive means 12 utilized for transmitting drive to the load 14 such as an AC generator as here indicated, but it is pointed out, more particularly hereinbelow, that the power plant may be utilized for directly driving any of various kinds of loads.

The power plant 10 of FIG. 1 includes a shell 16 of suitable material, such as steel having good heat conductivity, and including a lower cylindrical portion 17 having an open lower end 18 and a hemispherical closed upper end or dome 20. The shell is preferably entirely encased by insulation 22 except for a small opening 24 at the top to be referred to again hereinbelow, and at the bottom.

A weight 26 is disposed in the shell, this weight preferably being in the form of a piston slidable in the cylindrical portion 17 and sealed therewith against the passage of air therebetween. This weight 26 forms a chamber 28 thereabove which for convenience will be referred to as the vacuum chamber, or reservoir, there being a partial vacuum formed in this chamber repeatedly as referred to below. As used herein, the term vacuum is generic and covers partial vacuum and reduced pressure. Upon a vacuum being thus formed in the vacuum chamber, and in response to operation of appropriate controls, as referred to below, the atmosphere enters through the bottom opening 18 and the pressure thereof raises the weight 26, and upon further manipulation, the weight is permitted to drop and it then drives the load, 14.

Connected to the weight and extending downwardly therefrom is a shank 30 having a rack 32 thereon which meshes with a pinion 34 mounted on a shaft 36. The pinion 34 is of known kind, one-way acting and overrunning. The shaft 36 leads to a speed increaser 38 from which another shaft 40 leads, the latter shaft extending through a control component 42 of known kind which operates to regulate the speed of the shaft 40, and includes means for braking the shaft.

The shaft 40 continues to the load 14 which in the present instance as indicated above is an AC generator, its output being indicated by the conductors 44. In the case of an AC generator, the component 42 operates to maintain the speed of the generator constant.

A first holding unit 46 for normally holding the weight in raised position is provided, this holding unit including a gripper 48 of bell crank shape having one finger 50 engageable with the shank 30, the shank being backed by a fixed abutment 52. The gripper 48 includes another finger 54 and the gripper is weight-biased in clockwise direction to a releasing position indicated at 50a. The gripper is moved in counter-clockwise direction into gripping or active position by means of a toggle joint 56 actuated by a solenoid 58, there being a compression spring 60 between the toggle joint and the gripper. When the toggle joint is moved to stable active position shown in solid lines, it moves the gripper in counter-clockwise direction to gripping position and after the weight is raised, it holds the weight in raised position. As the weight is being raised, the gripper remains in gripping position, but the spring 60 enables it to yield to enable the shank to move therepast. When it is desired that the weight be lowered, the solenoid 58 is actuated for moving the toggle joint 56 to its retracted position indicated in dot-dash lines, enabling the gripper to move to its retracted position 50a.

A second holding unit 62 is provided, for preventing the weight from being raised under controlled conditions referred to below. This unit 62 includes a fixed backing member 64 and a gripper 66 similar to the gripper 48, but reversed in position. The gripper 66 is weight-biased in clockwise direction to gripping position shown in solid lines and in that position prevents the weight from being raised. A solenoid 68 is provided for moving the gripper 66 in counterclockwise direction to a releasing position as indicated by the dot-dash lines 66a.

In the operation of the power plant the air in the vacuum chamber or reservoir 28 is heated, by means of a heating element 70 which may be applied directly to the surface of the domed closure element 20 of the shell, and covered by the insulation. This is an ordinary electrical resistance heating element, connected by conductors 72 having terminals indicated at 74 which may be connected with a suitable source of energy, such as the output 44 of the generator 14, or other source such as a battery. A suitable means 76 is interposed in the conductors 72 for providing the desired control such as temperature-responsive, pressure-responsive, manual control, etc.

Pursuant to the air in the vacuum chamber 28 being heated, the consequent rise in pressure thereof forces a portion of it out through a check valve 77 at the top of the shell which includes a closer 78 yielding outwardly in response to the increased pressure, this closer being mounted on the lower end of a stem 80 extending through the opening 24 in the insulation and surrounded by a compression spring 82 which reacts between the closer and a fixed element 84.

After the desired heating step is performed, and the heating element 70 shut off, a cooling step is performed, this being done by means of a cooling unit 86 which may be a conventional cooler such as a refrigerator, having an evaporator coil 88 applied directly to the shell, also under the insulation, preferably at the top closure element 20 thereof. The cooling unit or refrigerator 86 may be operated electrically, the unit having conductors 90 for that purpose, for connection with any suitable source such as the generator 14.

Upon the heating unit 70 being operated, the air in the vacuum chamber 28 is heated to the desired degree, and throughout this step the air in the chamber escapes through the opening 76 as referred to above. Upon the heating unit 70 being turned off, the valve closer 78 is moved to closed position by the spring 82, and upon subsequent actuation of the cooling unit the air in the chamber 28 is of course cooled, and is thereby rarefied and the weight is lifted under the influence of atmospheric pressure. It is desired that the holding unit 62 be retained in holding or gripping position during this cooling step, to hold the weight in lower position against the action of the atmospheric pressure until after the cooling step is completed, and then the unit 62 is released. The advantage of this step is that the sudden action of the atmospheric pressure and the corresponding rapid raising movement of the weight, will carry the weight by inertia to a position higher than if it were permitted to be raised slowly. In this raising movement, the gripping unit 46 freely enables the weight to be raised as explained above, but the constant tendency of the gripper 48 to grip, prevents the weight from immediately dropping.

Preferably means is included for automatically releasing the holding unit 62 and this includes a pressure actuated switch 92 which includes a tube 94 communicating between the vacuum chamber 28 and the housing 96 of the switch, which is closed by a flexible diaphragm 98 which carries an electrical contactor bar 100. Within the housing 96 are electrical contacts 102 on conductors 104 in circuit with the solenoid 68 and leading to terminals 106 which may be connected with a suitable source of energy, such as the output of the generator 14, or a battery, or other source- Upon a rarefied condition being produced in the vacuum chamber; this rarefaction is transmitted to the interior of the housing 96 and the atmospheric pressure biases the diaphragm 98 inwardly, moving the contactor bar 100 into engagement with the contacts 102, closing the circuit to the solenoid 68 and actuating the latter and thereby releasing the holding unit 62.

After the weight is thus raised and it is desired to permit it to drop, the holding unit 46 is released, and the valve 78 is opened, the latter by means of a lever 108 or other suitable device. Thereupon, the weight drops under the influence of gravity, and, through the rack and pinion 32, 34, drives the generator. As the weight is being raised, the pinion 34 overruns the shaft 36. This also enables the shaft to continue to turn in forward direction by other power plants referred to below. The weight is limited in dropping by suitable stop means 110.

Figure 2:
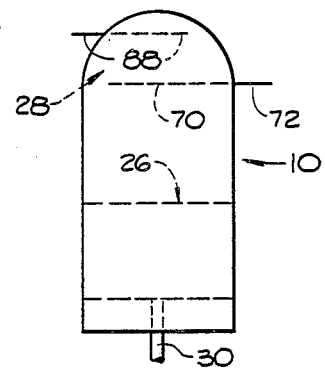
FIG. 2 is a small scale view cf the device showing a modified arrangement of heating and cooling for producing a partial vacuum.

FIG. 2 shows an alternative arrangement of the heating and cooling units. Both are positioned within the vacuum chamber 28, the heating element 70 in a lower position and the cooling unit 88 in an upper position.

Figure 3:
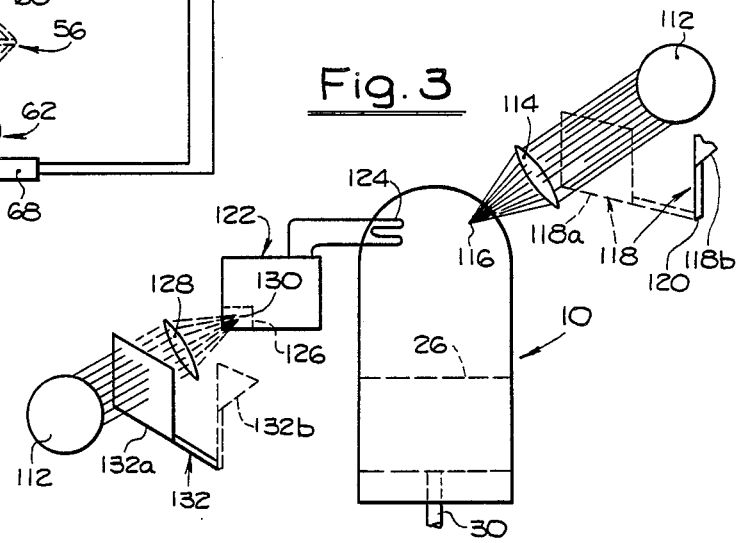
FIG. 3 is a view of the power plant in an arrangement utilizing natural heating and cooling.

FIG. 3 represents the power plant as being controlled by the natural elements. The power plant 10 may be provided with the various accouterments of FIG. 1 for controlling the weight, but the air in the vacuum chamber 28 is heated by the sun, indicated at 112, the rays of which pass through a lens 114 which concentrates the rays at 116 on the shell, thus heating the air therein. It will be understood that this representation is diagrammatic, there being various devices, represented by the element 114, known for concentrating the sun's rays in the manner stated. The apparatus is provided with a shield 118 pivoted at 120 swingable into a shielding position shown in dot-dash lines 118a and non-shielding position shown in solid lines at 118b. In the heating step the shield is moved to non-shielding position, and in the cooling step, to its shielding position to delete the effects of the sun's rays.

A cooling unit or refrigerator 122 is provided, having an evaporator coil 124 operatively engaging the shell. The cooling unit or refrigerator 122 may be of the absorption type, now known, and epitomized by the Electrolux. That cooling unit includes a heater element here indicated at 126 which in response to heat being applied thereto produces the cooling action. In this case the sun 112 is shown, the rays of which are concentrated by a lens 128 at 130 on the heater element 126. In this case also a shield 132 is provided, being shown in a shielding position in full lines at 132a and a non-shielding position at dot-dash lines at 132b. The heating and cooling units, as noted above are actuated alternately, and while the heating unit is being actuated the suns rays are shielded from the cooling unit, and vice-versa.

Figure 4:
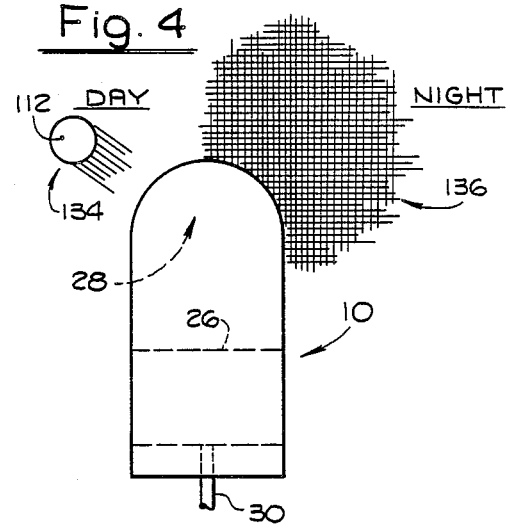
FIG. 4 is a view of the power plant, and indicating ambient day/night light conditions utilized in heating and cooling.

FIG. 4 shows natural heating and cooling in their simplest form. In this arrangement, the air in the vacuum chamber 28 is heated directly by the warm ambient air in the daytime as indicated at 134, and by direct impingement of the rays of the sun 112, and cooled by the cool night air as represented at 136. This would produce a simple day/night cycle.

FIG. 5 shows the use of a plurality of power plants for driving a single load. The power plants 10 have their shanks 30 driving the over-running pinions 34 on a common shaft 136 which drives the load 14 as referred to above. The utilization of a plurality of power plants as in this figure enables continuity of drive of the load; the weights are staggered in their altitudes or vertical positions so that they reach bottom at different times, and as seen as each weight is being raised, the remaining weights continue the drive, without cessation of the resultant drive to the load. This situation would be an advantage also in the case where one or more of the weights should reach bottom and not have attention for a span of time before they are re-activated or raised, and their absence from action would not adversely affect the drive to the load. A further specific advantage is that repair and maintenance of the power plants are facilitated.

In carrying this feature of the invention into effect, i.e., as represented in FIG. 5, the load 14 and the control component 42 are pre-selected as to capacity and other characteristics that they are not overburdened, by a plurality of power plants, and still operable by a single power plant. The specific number of power plants utilized is indeterminate;—a large number of smaller power plants may be utilized, or smaller number of large power plants, and hence that number need not be that shown in FIG. 5, namely six; however, there should be at least two, and preferably more than two, so as in the latter case to minimize the proportion of the inactive power plants to the whole.

FIG. 6 shows an alternate form of drive mechanism from the weights to the load. In this case, the drive shaft 36 is provided and it extends through a plurality of shells above the uppermost limit to which the weights are raised. The shaft may be mounted in suitable bearings 137 in the shells, and in each shell is a reel or spool 138 on which a cable 139 is coiled, the cable being connected to the weight 26. These spools 138 are also of one-way, over-running character and are moved in reverse over-running direction by a torsion spring 140 pursuant to raising of the weight, taking up the slack in the cables. In this case also, it is desired that the weights be at different elevations relative to each other in normal operation.

FIG. 7 represents the use of the power plant for any of various loads. Although an AC generator 14 is utilized in the apparatus described above, the power plant may also be used for driving other loads, such as a DC generator 142, a pump 144, a compressor 146, a grinder 148, etc. These various loads may be driven in unison or alternatively.

As used herein "energized" means to produce a vacuum in a unit above the weight therein, and "activate" means to raise the weight, which is done by atmospheric pressure. The two steps, energizing, and activating, are thus separate, and they are sequential, that is, after the energization, the activation is produced.

As to the height or vertical dimension of the weight itself this would be such that its mass would of course be less than atmospheric pressure. Steel may be for example in the neighborhood of 7.82 g/cm$^3$, and a column of steel one square centimeter in cross section, of approximately 131 cm. in height, would equal the "standard" atmospheric pressure of 76 cm. of mercury. What percentage of this pressure the weight would assume would depend on many circumstances, but may be in the neighborhood of 80%, 85%, 90%, etc. At 85%, its vertical dimension would be approximately 111 cm., and a weight of that dimension, of approximately 3.84 m. in diameter, would weigh about 100 metric tons.

Reference is now made to FIGS. 8–13 showing a power plant containing a plurality of power plant units. The basic concept involved in this form of apparatus, is a plurality of power plant units and a common reservoir or vacuum chamber communicating with all of those units. A principal factor is that the vacuum chamber is of great capacity compared with a single power plant unit, with a great advantage in utilizing a small differential in pressure in the vacuum chamber which results in a great difference in quantity of air in an individual plant unit, relative to the volume of that unit, when the vacuum in the vacuum chamber is brought to bear on a single power plant unit.

Reference is made first to FIGS. 8–10 where an enclosure 150, forming a main, or outer, shell is mounted in a suitable manner, such as on a base 160. The main shell 150 contains an interior space or common vacuum chamber or common reservoir 162, and positioned therein are a plurality of individual power plant units 164 which may be of any suitable number, such as three in FIGS. 8–10. Each of the individual plant units 164 includes an individual shell or cylinder 166 and a weight 168 similar to the weight 26 slidable in the cylinder. Secured to the weight 168 is a shank 170 similar to the shank 30 leading to various control elements, as in the arrangement of FIG. 1. The shank 170 may lead to any convenient location, such as into or through a hole 172 in the base.

Each power plant unit includes a unit chamber or reservoir 174 above the weight 168 which communicates with the common vacuum chamber 162 through an opening 176 which is closable by closure member 178. The shell 166 is otherwise closed against the common vacuum chamber 162.

The unit vacuum chamber 174 communicates with the exterior through an opening 180 which is closable by a door 182. The interior of the cylinder 166 has constant communication with the exterior through an opening 184 which is below the weight 168, in all positions of the latter. An exhaust blower 186 is provided for withdrawing air from the common vacuum chamber 162.

Referring to the specific construction of FIGS. 8–10, a principal feature is that the volume or capacity of the common vacuum chamber 162 is immense and enormous relative to the volume of any one unit vacuum chamber 174.

The proportions of the various components of the power plant may be varied according to desires, and according to various circumstances encountered in each installation. In FIGS. 8–10, the volume of each individual power plant unit, or all of them together, is relatively small compared to the volume of the common vacuum chamber. This great relative difference is provided by mere dimensions of the corresponding elements, but also, at least at times, by the fact that not all of the individual power plant units would be active at the same time. Perhaps only one of them, or two of them would be active at any particular time. In this kind of installation, the relationship between the elements results in the fact that the common vacuum chamber is empty. However the invention is sufficiently broad to incorporate that concept in an apparatus that also includes a greater number of individual power plant units whereby a common vacuum chamber Of the same dimensions as viewed vertically can be utilized, but filled or substantially filled with individual power plant units with an effect similar to that of a small number of power plant units. Such an arrangement is illustrated diagramatically in FIGS. 11 and 12. In the latter figures, a container 188 is similar to the container 150, and includes an interior space 190 forming the common vacuum chamber or reservoir. In this space 190 are a great number of individual power plant units 192, of the same kind as the units 164 in FIGS. 8–10. In the present case the individual units may be sixty in number. In this case the overall dimensions of the power plant are so great that even though the common vacuum chamber per se, exists only at the top of the casing, that space should nevertheless be great and immense relative to and one of the individual power plant units. The height of the vacuum chamber may be as desired, and any additional increment above the individual power plant units would add greatly to its overall volume.

In the operation of the power plant, all the openings 176 are first closed, and then the exhaust tower 186 is operated. This draws a portion of the air from the common vacuum chamber 162, and establishes a vacuum therein of a desired value as referred to again hereinbelow. When it is desired to activate a selected power plant unit 164, the opening 180 of that unit is closed and then the opening 176 is opened. The vacuum in the common vacuum chamber 162 is thus transmitted to the unit vacuum chamber 176 in that unit selected, i.e., a portion of the air in that unit flows through the opening 176 into the common vacuum chamber. This results in a uniform vacuum throughout the common vacuum chamber and extending into the individual unit vacuum chamber. The next step is performed as described above in connection with FIG. 1, i.e., first the weight is held down in lowered position and after the desired vacuum has been established in the unit above the weight, the weight is abruptly released and atmospheric pressure raises the weight in a rapid movement, as noted above.

When it is desired to activate the selected power unit, the opening 176 is closed, and the opening 180 is opened, enabling the atmosphere to move into the shell above the weight. Then the weight is released and permitted to drop under controlled conditions, the opening 176 remaining open throughout the dropping of the weight.

FIG. 13 shows another arrangement in which the desired common vacuum chamber or reservoir may be provided by a cavern in the ground. Such a cavern is indicated at 194 which may be a natural cavern, or an excavated hole, and in either case, suitably lined to be airtight if necessary. An individual power plant unit 196 similar in all material respects to the units 164 is provided, and may be on the exterior, and the unit vacuum chamber therein, above the weight, communicates through a conduit 198 with the cavern or common vacuum chamber. As in the previous case, an exhaust blower 200 is provided to produce the desired vacuum in the cavern. A single power plant unit 196, or a plurality of such units as desired, may be incorporated in the apparatus.

The apparatus of FIGS. 8–10, or the apparatus of FIGS. 11–12 may be effectively placed in the sun, without any insulation material thereon. The casing is of high heat conductivity, such as steel, and because of its great and immense area, an enormous amount of heat will be applied thereto from the sun. This will raise the temperature of the air therein to a very high degree, in many cases as high as 125° F.–135° F. This results in an immense heating of the air in the vacuum chamber and expulsion of a great portion of the air, and corresponding rarefaction of the remaining air in the vacuum chamber upon cooling.

Air expands at the rate of about $\frac{1}{3}$ or more per 100° C. rise in temperature, and as a specific example, arbitrarily selected as to quantities, assume the weight produces a volumetric displacement of 30 m³ in its movement in the housing, a vacuum chamber of about 90 m³, upon production of a partial vacuum therein by heating the air 100° C. rise, will effect raising the weight its full range. The power plant or apparatus of FIGS. 8–13 involves the production of the vacuum by mechanically withdrawing air from the vacuum chamber of reservoir, as contrasted to that of FIGS. 1–7 in which the vacuum is produced by varying the temperature of the air, but in either case the same value of vacuum produced will effect raising the weight the same amount.

Figure 14:
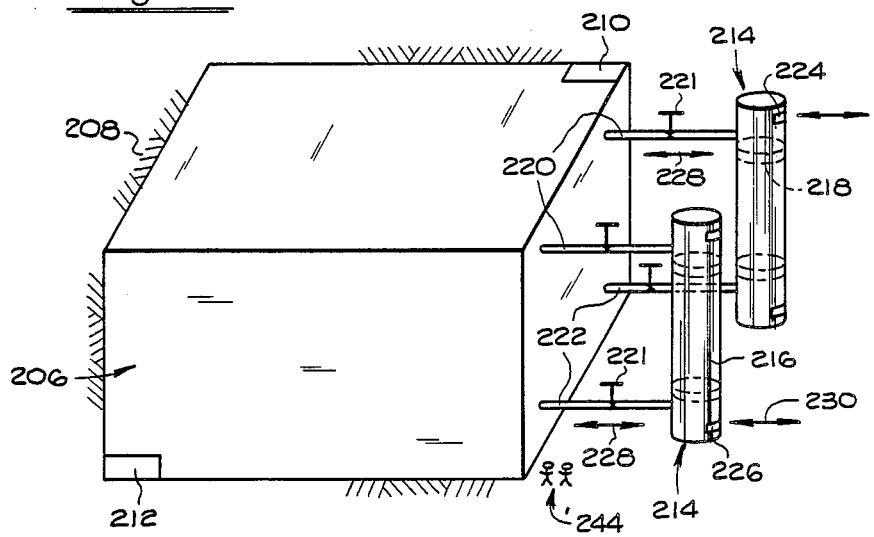
FIG. 14 is a perspective view of a modified form of power plant, for utilizing a body of air of a pressure greater than atmospheric pressure.
Figure 15:
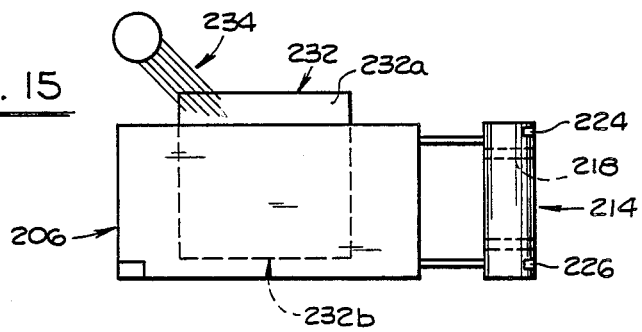
FIG. 15 is a side view of the power plant of FIG. 14 including means for solar heating the air in the reservoir.
Figure 16:
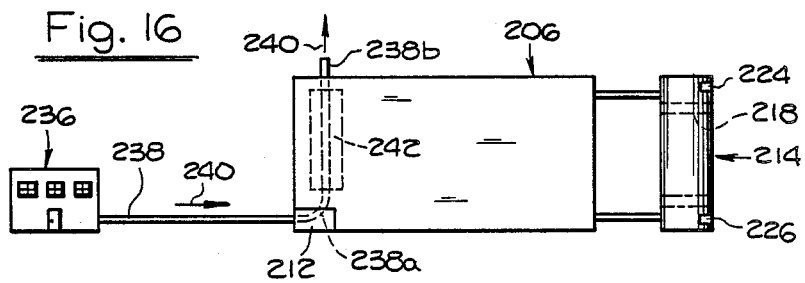
FIG. 16 is a side view of the power plant of FIG. 14 in association with a manufacturing plant from which the waste gases are utilized for heating the air in the power plant.

The foregoing includes the utilization of a vacuum, or reduced pressure body of air, in conjunction with the atmosphere, wherein the atmosphere itself is utilized for raising the weight. As set out hereinabove, the inventive concept includes the generic arrangement of utilizing a body of air, that instead of being a vacuum, is of a pressure greater than atmospheric pressure. and that pressurized air is utilized for lifting the weight, against the atmosphere. Such an arrangement is illustrated in FIGS. 14–16. FIG. 14 shows a main chamber 206 which may be a cavern in the ground, indicated at 208, similarly to the cavern 194, and in this case also such a chamber of great dimensions will of course be a great advantage. The chamber has closable openings 210, 212, for enabling the relatively cold natural air currents to flow through the chamber.

Operably associated with the main chamber are individual power plant units 214, which may be of any desired number, two such being shown here. Each includes an individual shell or cylinder 216 in which is a weight 218, similar to the corresponding components 166, 168, of FIGS. 8–10.

Each power plant unit 214 is closed at the top and bottom ends, and each has communication with the cavern or main chamber 206, through passages 220, 222, at top and bottom respectively, above the uppermost position of the weight, and below the lowermost position, as indicated. Each shell 216 has an upper closable opening 224, above the uppermost position of the weight, and a closable opening 226, below the lowermost position of the weight. Air currents may pass in each of both directions through the passages 220, 222, as indicated by the arrows 228, and through the openings 224, 226, as indicated by the arrows 230. The air currents will be referred to hereinbelow.

In the present form of the apparatus, in FIGS. 14–16, the air in the main chamber or cavern 206 is heated rather than cooled. FIG. 15 shows an arrangement for heating the air by solar heating, including a heat transfer unit or component 232, of known kind, having an upper portion 232a subject to the sun's rays as indicated at 234. The unit includes a lower portion 232b extending down into the interior of the cavern or the main chamber for transferring the heat generated in the upper portion, to the air in the chamber.

FIG. 16 shows an arrangement for heating the air in the main chamber by waste gases from a manufacturing plant. In this figure such manufacturing plant is indicated at 236, and as used herein, that designation is intended to be generic to any source of artificially supplied hot gases. The hot gases flow from the plant 236 through a passage 238, as indicated by the arrow 240, into and through the main chamber as indicated at 238a, the passage having an outlet terminal portion 238b where the gases escape to the exterior as indicated by the arrow 240. A heat transfer component 242 may be utilized, if desired, to transfer the heat from the hot gases to the air in the main chamber.

In the operation of the apparatus of FIGS. 14–16, the openings 210, 212, are opened, to let relatively cold air pass therethrough by natural currents, at night in warm climates, and at any time in cold climates. When the air in the main chamber has reached its lowest temperature, the openings 210, 212, are closed, and the air in the chamber heated. In this step the air is confined in the chamber, and of course is pressurized by the heat, and to apply the pressurized air to lifting the weight, the lower opening 226 in the unit 214 is closed, and the upper opening 224 is opened. At this step the passages 220, 222, are closed by the valves 221. Then to lift the weight, the valve in the lower passage 222 of the respective unit is opened, enabling the heated pressurized air to flow into the unit below the weight, and raise the weight. After the weight is so raised, the corresponding valve 221 is then closed. In later steps, when the weight is to be dropped, the opening 224 remains open, and the opening 226 is opened. It will be understood that all of the control accouterments of the previous embodiments may be incorporated in this arrangement.

It will be understood that the arrangement of FIGS. 14–16 can be utilized with a vacuum in the main chamber, instead of pressurized air. For this purpose the two, upper and lower, passages 220, 222, and the two, upper and lower, openings 224, 226, are provided. These passages and openings are closed or opened according to which phase is utilized, i.e. whether pressurized air, or a vacuum, is utilized in the main chamber.

Concerning the use of pressurizing the air in the main chamber by heat, the relatively great variation between upper and lower temperatures achieved by solar activity are known, and the pressure in the air in the main chamber can reach extreme pressures, with corresponding advantages in lifting the weights. Even to a much greater extent, can that air be heated by the hot gases from manufacturing plants. These hot gases reach great temperatures, and can heat the air in the main chamber to greater temperatures than by solar heat, with corresponding great advantages, and considering the practically unlimited dimensions to which the main chamber can be made, the power that can be generated is immense.

A principal and important feature of the apparatus of FIGS. 8–16 is the small amount of power required for energizing and activating a power plant unit, and hence all of the units; this relationship exists in both phases of operation, i.e. utilizing vacuum, or utilizing air of pressure greater than atmospheric pressure; in the case of the vacuum phase, a relatively small value of vacuum, as represented by a few pounds pressure, in the common vacuum chamber is capable of lifting the weight in any single unit. This is in great contrast to the value of the vacuum, or comparable pounds in pressure, that would be necessary in the shell of a single unit. A similar situation exists in the case of pressurized air—the absolute amount of air that is pressurized, is immense relative to the volume of a single power plant unit. As an example of this relationship, attention is directed to the following set of figures referred to above. It will be appreciated that the individual power plant units may be of any desired size, within reasonable bounds, and in the example given, the weight produces a volumetric displacement of 30 m³ in its movement in the housing; to withdraw 30 m³ from a small vacuum chamber such for example as 40 m³, a great vacuum would be required, that is, a vacuum representing a quantity of air equal to ¼ of the atmosphere in the given space. Great power would be required to produce that vacuum, in a single unit, but in the present case, an operable vacuum in the common vacuum chamber need be only a small fraction of that noted above. In the case where the common vacuum chamber has a volume 100 times greater than that in a single unit vacuum chamber, a withdrawal of 1% (approximately) of the air in the common vacuum chamber would produce a sufficient vacuum to lift a single weight its full altitude by atmospheric pressure, which would be a step resulting in replenishment of air in the common vacuum chamber to produce a pressure equal to atmospheric pressure. It will be understood of course that the foregoing would be the perfect situation, and allowance must be given for inaccuracies, inefficiencies, friction, etc., it being necessary of course to provide a certain minimum power to overcome friction, and the atmospheric pressure would not lift the weight to a point representing perfect atmospheric pressure in the vacuum chamber. However, giving allowance for the minimum power required to overcome these inaccuracies, etc., which would be relatively small, the next increment of power necessary for raising a single weight would be, as noted above only approximately equal to 1% of that required to raise the weight by producing a vacuum in proportion to a single power plant unit. As is generally known, the power required to produce vacuum increases greater than arithmetically as the vacuum increases so that the power required for producing a first percent of a vacuum is less than that required for producing each successive percent, i.e. the second percent, the third percent, etc., and up to 100% of the ultimate vacuum required otherwise than by this invention, the power required would be enormous at the end of that range.

The vacuum extends throughout the common vacuum chamber and each unit vacuum chamber, and constitutes a power medium effective uniformly at each and every point throughout its dimension or extent, acting in each individual power unit in the same manner and to the same extent as at any point in the common vacuum chamber; a moiety of the entire power medium is applied at any point, in contrast to any incremental part thereof.

As noted above, the time required for producing the desired vacuum is relatively short, and may be only a matter of minutes. On the other hand, after a weight 26 has been raised, and it is permitted to drop for driving the load, it may thus proceed to drop throughout a period of time that is much longer, and may be in the range of hours, a full day, etc. Therefore the weights in the several power plant units may be raised at different times, and singly, with the great advantage of a low vacuum required, each requiring such a short time for its raising the weights individually without impeding the progress of raising others, and all of them. Moreover, the utilization of a great number of units, and weights, in a single apparatus, accommodates great flexibility in the use of the power produced by the dropping weights, i.e., running the load 40, or a plurality of loads. The requirement for driving loads would vary under many circumstances, and at times the operation of all of them would not be required, while at other times it may be required to drive many of them in unison; a large number of the weights can be raised even though not immediately needed, and thus the potential energy of all the weights together can in effect be stored during times of relative inaction, and later dropped when great action is required.

In carrying this phase into effect, the exhaust blower may be operated continuously and at a rate calculated to produce the effective total value of vacuum for raising all of the weights in the period of time in which the weights would drop. It may not necessarily be that the effective value of the vacuum for raising a single weight would be 1% of the total number of weights which might be presumed because of the relative volumes of the vacuum chamber, but the raising of a weight may require much less time than 1% of the total time of dropping or the average time of dropping of the weights. For example, if it should require 5 min. of the operation of the exhaust blower to produce the value of vacuum necessary for raising a single weight, and a weight drops in its operation over a period of 12 hours for example, then the time period of 5 minutes would be 1/144 of the total time of 12 hours, or 720 minutes. If the average should be that noted, 720 minutes, then the exhaust blower 186 could be of such capacity that it could produce 1/144 of the total effective value of vacuum required. If on the other hand the average time of the dropping of the weights should be, a full day, or 24 hours, then a power of ½ of the assumed capacity could be utilized, i.e. one capable of producing 1/288 of the total capacity required.

Regardless of the number of power plant units 12 utilized in the apparatus, the time required for activating a single unit, i.e., raising the weight therein, by atmospheric pressure, is the same whether in the case of the apparatus of FIGS. 1-7 or FIGS. 8-13.

The method of the invention includes converting one form of potential energy, atmospheric pressure, to another form of potential energy, a raised weight.

All of the weight is fully active at all times, in contrast with falling water where elevation and speed of falling are necessary factors, and where individual particles strike the water wheel individually and are only individually effective, and not as part of a greater mass.

Another great advantage of the invention is that the apparatus is pollution-free.

A still further and extremely important advantage is that it utilizes only a renewable or non-dissipatible resource.

The effectiveness of the power plant of the invention is of great proportions. Its effectiveness is virtually unlimited, since the greater its size (diameter), and the greater the altitude to which the weight can be raised, the greater is the power that will be provided, and both are limited only because of practical considerations.

In the case of its size (diameter) it can be made of almost any size, since the space required, in area, as on the ground, is insignificant. Regardless of its size (diameter) atmospheric pressure acts on it in exactly the same manner, whether it is 10 centimeters, for example, or 10 meters.

A similar condition exists in the case of altitude to which the weight is raised. It can be embedded in the ground, or built in towers above the ground, and in either case, that altitude could be, for example, 5 meters, or 10 meters, or 50 meters. In any case atmospheric pressure would raise the weight an equal amount so that for a greater altitude the time required for raising it to its total altitude is a linear extension of the time required for a lesser altitude; this relationship would be modified only by the diminishing decrease in the space above the weight in proportion to the total space in each increment of raising the weight; in the case of the apparatus of FIGS. 8–13, the diminishing decrease of that space would have minimal effect. There is no law of diminishing returns applicable to the apparatus with respect to the work done by the weight in dropping.

The apparatus is characterized by, and possesses advantages because of, its immense size. It is non-portable, and fixed in the ground, and is incapable of being transported without dismantling the plant, and is enormously massive relative to the size of a human being indicated at 244, FIG. 14 (right, bottom).

The power plant can be re-activated in an extremely small portion of its total operating cycle. Producing the vacuum either by heating and cooling, or by exhausting it by blower, can be accomplished in a matter of minutes, while the time in which the weight drops in operation may be many hours.

The power plant is of uniform effectiveness throughout its range of operation—throughout the complete drop of the weight, whether at the beginning or at the end of its range. It will perform the same amount of work in dropping one meter from an altitude of two meters, as in dropping one meter from an altitude of fifty meters.

Another great advantage is the enormous capability of reactivating the power plant. This capability derives from the constant and ever-present activity of atmospheric pressure. In any given installation, after a power plant has spent itself, by the weight completely dropping, it can be re-activated immediately because atmospheric pressure is immediately active,—it is "waiting". There is no need to wait for favorable conditions to come into existence which are out of the operator's control, such as in the case of solar or wind power. This advantage is of significance in the design of equipment as compared with that intended to provide continuous operation despite long periods of inactivity of the original source of power, such as solar wind. Where such long periods of inactivity occur, a greater amount of equipment is necessary to tide over these periods to assure continuous operation, but where, as in the present case, the power plant can be immediately reactivated, the total equipment necessary is less. Power plants activated by solar or wind power are limited, from a practical standpoint, to particular world locations where those sources of power are vary plentiful, but in the present case there is no limitation in that direction, but the power plant is effective regardless of location, or climate, or season, whether it is sunny or cloudy, day or night, windy or calm, hot or cold, whether in high atmospheric pressure or low, or on land or water.

I claim:
1. A power plant for driving a load comprising,
a vertical shell having an open lower end and a closed upper end,
a weight slidable in the shell in sealing engagement therewith against the passage of air therebetween, the shell and weight forming a vacuum chamber in the shell above the weight, and the weight being exposed directly to atmosphere through the open lower end of the shell,
means independent of the atmosphere and the pressure thereof for producing a partial vacuum in the vacuum chamber of a value substantially less than atmospheric pressure, the atmosphere acting directly on the weight, and because of the partial vacuum, raising it in the shell,
driving means operably and constantly interconnecting the load and the weight, and
means for controllably dropping the weight only under the action of gravity for thereby driving the load throughout the dropping movement of the weight.

2. A power plant according to claim 1 in conjunction with said load, and wherein,
the load includes an AC generator, and
in conjunction with control means for maintaining a constant generator speed.

3. A power plant according to claim 1 and including,
first latch means for releasably securing the weight in raised position in response to the weight being raised, and capable of being controllably released for enabling the weight to drop.

4. A power plant according to claim 1 and including,
second latch means for releasably securing the weight in lower position, and capable of being controllably released for enabling the weight to be abruptly raised by atmospheric pressure after a partial vacuum is produced in the vacuum chamber.

5. A power plant according to claim 4 and including,
means responsive the partial vacuum in the vacuum chamber reaching a predetermined value operable for releasing said second latch means.

6. A power plant according to claim 1 wherein,
the driving means includes a shank secured to the weight and extending downwardly therefrom the open lower end of the shell, the shank having a rack thereon, and
a drive transmitting member having a pinion in mesh with the rack and a shaft operably connected with the load.

7. A power plant according to claim 1 wherein,
the driving means includes a shaft extending through the shell and through the vacuum chamber, the shaft being adapted for connection with the load exteriorly of the shell,
a reel secured to the shaft in position within the vacuum chamber, and
a cable interconnecting the shell and the reel.

8. A power plant according to claim 1 wherein,
said driving means has a predetermined operating range,
the lower portion of the shell has a vertical extent for providing an operating range for movement of the weight therein, said extent being complementary to the operating range of the driving means, and the shell has an upper portion appreciably larger than the minimum required for necessary strength of the shell, whereby to provide a vacuum chamber having a volume appreciably greater than the volume controlled by the operating range of the weight.

9. A power plant according to claim 8 wherein the weight produces a predetermined displacement in its movement throughout its operating range, and
the volume of the upper portion is appreciably larger than said displacement of the weight.

10. A power plant according to claim 1 wherein,
the means for forming the partial vacuum includes means for heating the air in the vacuum chamber and enabling a portion of it to escape therefrom, and
means for forming an opening in the shell after the weight is raised for enabling entrance of atmosphere into the vacuum chamber, and thereby constituting said means for destroying the partial vacuum.

11. A power plant according to claim 10 wherein,
the means for producing a partial vacuum includes valve means yielding outwardly for enabling heated air to escape, but biased to closed position for normally preventing entrance of atmosphere into the vacuum chamber, and
means for controllably opening the valve means constituting said means for forming an opening in the shell.

12. A power plant according to claim 10 wherein,
the means for forming a partial vacuum also includes means for cooling the heated air in the vacuum chamber.

13. A power plant according to claim 12 wherein,
the load is capable of developing power in response to being driven, and
the power plant includes means for operating the heating and cooling means and in doing so, utilizing power developed by the load.

14. A power plant according to claim 12 wherein,
the shell includes an inner heat conducting element, and the heating and cooling means include respective heating and cooling elements in operable heat transfer engagement with said inner element of the shell.

15. A power plant according to claim 12 wherein,
the heating and cooling means include respective heating and cooling elements positioned within the vacuum chamber.

16. A power plant according to claim 12 wherein,
the cooling means includes absorption type refrigerator means having a cooling element in cooling engagement with the shell, and has a control element which in response to being heated produces a cooling effect in the cooling element, and
the power plant includes means for concentrating the sun's rays on said control element.

17. A power plant according to claim 12 wherein,
the load is capable of developing power in response to being driven,
the power plant includes means for operating the heating and cooling means by the power developed by the load, and
the weight has a displacement volume less than the total interior space of the shell above the piston when the piston is in its lowermost position, whereby the greater amount of air in the total interior space of the shell need be heated and cooled only to a lesser absolute temperature extend for effecting displacement of a predetermined volume of air in said displacement volume.

18. A power plant according to claim 12 and including,
means for heating and cooling air in the vacuum chamber by direct heat transfer engagement with the shell by the ambient air.

19. A power plant according to claim 18 and including,
means for concentrating the sun's rays on the shell and thereby heating the air in the vacuum chamber.

20. A power plant according to claim 12 wherein,
the load is capable of developing power in response to being driven and,
the power plant includes means for operating the heating and cooling means by the power developed by the load.

21. A method of producing power comprising the steps,
confining a weight,
producing a partial vacuum, independently of the atmosphere or the pressure thereof, of a value substantially less than atmospheric pressure, over the weight,
imposing atmospheric pressure directly on the weight in opposition to the partial vacuum and thereby raising the weight, and
dropping the weight and driving a load by the potential energy of the weight throughout the dropping movement of the weight.

22. A method according to claim 21 wherein,
the partial vacuum is produced by heating the air in the vacuum chamber and allowing a portion of the heated air to escape therefrom, and
thereafter cooling the air that remains in the vacuum chamber and preventing the entrance of atmospheric thereinto, whereby it contracts to a rarefied condition.

23. A method according to claim 21 and including the step,
holding the weight in lower position while the partial vacuum is being produced, and thereafter releasing the weight to enable atmospheric pressure to raise the weight abruptly, whereby the weight rises by inertia to a height greater than it would rise in gradual movement corresponding to production of the partial vacuum.

24. A method according to claim 20 and including the steps,
confining a plurality of weights,
so imposing the atmospheric pressure on the weights selectively, and
so dropping the weight selectively.

25. A method according to claim 24 wherein,
each weight has a predetermined range of movement, and thereby having a corresponding displacement volume,
and including the step,
producing the partial vacuum in a space which has a volume of on the order of one-hundred times larger than said displacement volume.

26. A power plant comprising,
a pressure chamber for confining a body of air,
means for producing a body of air in the chamber at a pressure different from that of atmosphere,
a weight,
means including passages for establishing communication between said body of air and the atmosphere and thereby producing a stream of air therebetween,
means responsive to the stream of air for lifting the weight, and
means for controllably lowering the weight by gravity and driving a load thereby throughout the lowering movement of the weight.

27. A power plant according to claim 26 wherein,
the first means is operable for producing a pressure in said body of air that is greater than that of the atmosphere.

28. A power plant according to claim 27 and including,
means forming a working chamber separate from the main chamber for mounting the weight therein for vertical sliding movement and in air-tight sealing engagement therein, the working chamber having passages at top and bottom each selectively closable to the main chamber and to atmosphere, and means for opening the passage at the bottom of the working chamber to the main chamber and opening the passage at the top of the working chamber to atmosphere, and thereby raising the weight.

29. A power plant according to claim 28 and including, a plurality of working chambers, each of small size relative to the main chamber, and wherein, the main chamber has openings at top and bottom, independent of said passages, for enabling natural-current relatively cold air to pass through the main chamber.

30. A power plant according to claim 29 and including, solar heating means for heating air in the main chamber.

31. A power plant according to claim 29 and including, means for utilizing waste heat from a manufacturing plant for heating the air in the main chamber.

32. A method of driving a load comprising the steps, providing a weight and mounting it for vertical movement, providing bodies of air of different pressures, applying only the air of the greater pressure against the lower surface of the weight while subjecting the upper surface of the weight to only the air of the lesser pressure, and thereby raising the weight, and controllably dropping the weight and thereby driving the load throughout the dropping movement of the weight.

33. A method according to claim 32 and including the steps, providing, in one of said bodies, air of a pressure greater than that of atmosphere.

34. A method according to claim 33 and including the step, producing the greater pressure in said one body by heating the air therein.

35. A method according to claim 34 and including the step, so heating the air by solar heating.

36. A method according to claim 34 and including the step, so heating the air by utilizing waste heat from a manufacturing plant.

37. A power plant according to claim 28 wherein, the main chamber and working chamber are nonportable, and fixed in the ground, and incapable of being transported without dismantling the plant, and enormously massive relative to the size of a human being.

38. A power plant comprising, a main vacuum chamber, a power plant unit having a unit vacuum chamber communicating with main vacuum chamber, and of less volume than the main vacuum chamber, a working member movably vertically in the power plant unit, the power plant unit being open to the atmosphere below the working member, means for producing a power medium in the power plant and the power medium so produced thereby extending throughout the main vacuum chamber and the unit vacuum chamber, and means for controlling the power medium for applying it to the working member and raising it, and in so applying it, applying a moiety of the whole power medium, as contrasted with an incremental part thereof, and the power medium that remains being of correspondingly reduced effectiveness in producing work successively in successive time increments.

39. A power plant according to claim 38 and including, a plurality of such power plant units.

40. A power plant according to claim 38 wherein, each power plant unit has a closable opening to the main vacuum chamber above the weight, and a closable opening above the weight to atmosphere.

41. A power plant according to claim 38 wherein, the power medium is a vacuum.

42. A power plant according to claim 41 and including, blower means operable for withdrawing air from the vacuum chambers for producing a vacuum therein.

43. A power plant according to claim 38 wherein, the volume of the main vacuum chamber is on the order of approximately one hundred times that of the vacuum chamber in a single power unit.

44. A power plant according to claim 43 wherein, the power plant unit is essentially within the main vacuum chamber.

45. A power plant according to claim 38 wherein, the power plant is exterior to the main vacuum chamber.

46. A power plant according to claim 43 wherein, the main vacuum chamber is embedded in the ground.

* * * * *